April 25, 1961 D. J. TIGHE 2,981,884
REGULATED VOLTAGE SUPPLY
Filed Dec. 3, 1958
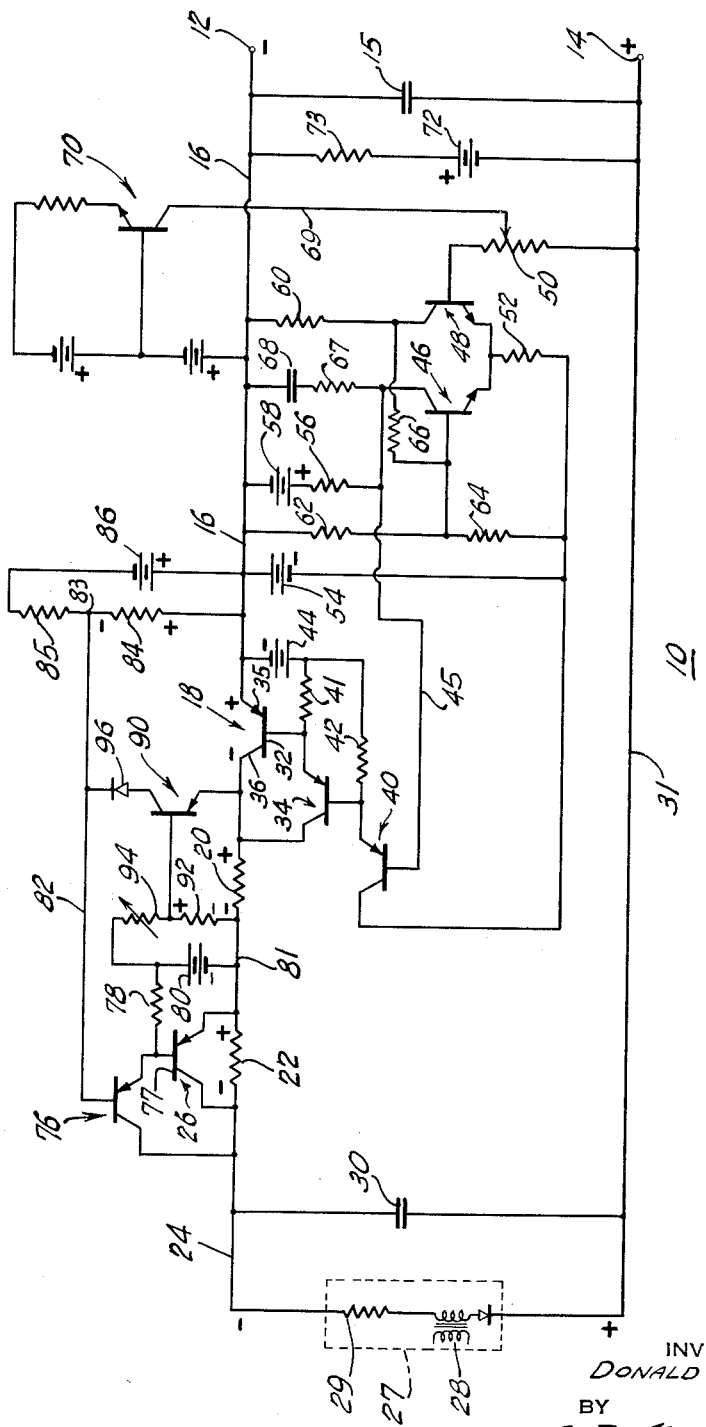
INVENTOR
DONALD J. TIGHE
BY
Curtis, Morris & Safford
ATTORNEYS

# United States Patent Office 2,981,884
Patented Apr. 25, 1961

2,981,884

REGULATED VOLTAGE SUPPLY

Donald J. Tighe, Millburn, N.J., assignor to Harrison Laboratories, Inc., Berkeley Heights, N.J., a corporation of New Jersey Filed Dec. 3, 1958, Ser. No. 777,959

9 Claims. (Cl. 323—22)

This invention relates to a highly regulated direct-voltage power supply.

An object of this invention is to provide an improved all-transistor circuit for closely regulating an output voltage.

Another object is to provide such apparatus which is very stable in operation and relatively simple in construction but yet which is able to hold an output voltage constant at a desired setting with from zero to large load currents.

Another object is to provide a circuit of this kind which is self-protecting so that upon overload or short circuit the easily damaged transistors will not be harmed.

A more specific object is to provide an all-transistor regulating circuit operating with a nominally constant input voltage to give a highly regulated output voltage of any chosen value within a wide range between zero and maximum.

These and other objects will in part be understood from and in part pointed out in the description given hereinafter.

In regulating a direct output voltage from a source it is customary to amplify variations in the output voltage and then apply these amplified variations in proper phase to a control element which corrects the output voltage and keeps it within close limits of a set value. One common kind of control element is a vacuum tube or tubes connected as a resistance in series with the source and the output voltage terminals, the grid or control electrode of the tube being changed in potential as required to keep the output voltage substantially constant.

A circuit using vacuum tubes in this way to regulate a voltage is well suited to applications requiring relatively very fast and exact regulating action. However, because vacuum tubes operate with heated filaments, they must be replaced from time-to-time when they burn out and they require appreciable stand-by power even at no load, thus lessening the power efficiency of the overall regulating circuit in which they are used. For these reasons, therefore, it is desirable to use transistors in regulators intended for many applications.

Among the limitations of transistors is their susceptability to damage or destruction by too great voltage or current or by excessive internal power dissipation. Moreover, under widely varying loads the internal heating of a transistor will change and cause a consequent drift in its amplification characteristics. In spite of these drawbacks, because of their compactness and long life, the possibility of operation without a heated cathode, and of operating efficiently with low voltages, the use of transistors in voltage regulators for many applications appears highly desirable.

Several difficulties, however, are encountered in an all-transistor circuit when one tries to regulate the direct output voltage all the way down to zero at full load current. Present day transistors are very sensitive to overvoltage and are quickly destroyed if the voltage across them exceeds their rated value. This value is frequently under 50 volts maximum. However, this is a maximum rating only for no current through the transistor; with appreciable current flow, the maximum permissible voltage across the transistor is far less, being determined by the maximum internal power dissipation or heating of the transistor. Now, at full load current and nearly zero regulated output voltage, the main regulating transistor or transistors in the circuit are subjected to the full input power. Thus, for example, with a circuit having an input voltage of 30 volts and a full load current of 2 amperes, the regulating transistors are called upon to dissipate almost 60 watts of power when the output voltage is set near zero at full load current, whereas they have to dissipate only about 10 watts of power when the output voltage is set at 25 volts, for example. To avoid this difficulty, it has been the usual practice to decrease the input voltage to the circuit at the same time that the output voltage was set to a lower value. In this way, the power dissipation within the regulating transistors could be kept to a more nearly constant value, this being an economy in terms of the number and size of the regulating transistors. However, in many installations it is necessary to control the output voltage of a number of power supplies simultaneously from a remote location, and it is highly desirable from the standpoint of simplicity and cost that each supply not have to have its input voltage varied simultaneously along with the output voltage. Also, if the input voltage of a supply could be left nominally constant, this would eliminate bulky and expensive elements, such as variable transformers or controllable magnetic amplifiers which are required to vary this voltage. The present invention provides an all-transistor circuit wherein the input voltage need not be changed when the output voltage is changed. The regulating transistors in this circuit, moreover, are efficiently used and are thoroughly protected against burnout by short circuits in the load, for example. The transient stability of the circuit is excellent and ripple or hum in the output voltage is greatly reduced.

In accordance with the present invention a main regulating transistor and a voltage dropping resistor are connected in series between a nominally constant input voltage source (such as a rectifier and fixed transformer) and an output lead. The voltage on the output lead is sensed and compared to a reference source by an all-transistor amplifying network which controls the regulating transistor to keep the output voltage constant at a set value. This amplifying network can be like the one shown in U.S. Patent 2,942,174.

The voltage dropping resistor in series with the main regulating transistor in the present circuit is shunted by an auxiliary regulating transistor which is operated as a variable switch to control and limit the power dissipation in the main regulating transistor. The total variation in the power dissipation in the main regulation transistor is thus far less for all conditions of output voltage and current than it would be without the dropping resistor and auxiliary transistor.

To prevent burnout of either of these transistors, when the output current exceeds a pre-determined value, the auxiliary transistor if turned off, and the main regulating transistor turned full on or driven to saturation. The maximum current which then flows is safely limited by the series dropping resistor, the voltage drop across the main regulating transistor being almost zero so that the maximum current then flowing cannot damage it.

A better understanding of the invention together with a fuller appreciation of its many advantages will best be gained from the following detailed description given in connection with the single figure of the drawing which shows a specific voltage regulating circuit embodying features of the invention.

The drawing shows a regulated voltage supply circuit 10 which has two output voltage terminals 12 and 14, upper terminal 12 being negative relative to the lower terminal 14. A large filter capacitor 15 is connected in conventional way between these terminals. Terminal 12 is energized by an output lead or conductor 16 which in turn is connected through a main regulating transistor 18, a small current sensing resistor 20, and a larger voltage dropping resistor 22 to a direct-voltage input lead 24. Resistor 22 is shunted by an auxiliary regulating transistor 26 to be described in detail later. Lead 24 is in turn connected to the negative side of a supply source 27, schematically indicated as a transformer-rectifier 28 having an internal resistance 29. This source is shunted by a large filter capacitor 30. A return current path from voltage source 27 to terminal 14 is provided by the conductor 31.

When a load is applied across the output terminals 12 and 14 and increased current drawn therefrom, a drop in voltage across these terminals which would normally otherwise occur is compensated for by an appropriate change in the voltage drop across series regulating transistor 18 or under certain conditions to be described shortly by a decrease in the voltage drop across resistor 22 which keeps the voltage drop across transistor 18 above a predetermined value. Direct voltage control signals in proper phase and amplitude necessary to maintain the output voltage on lead 16 and terminal 12 substantially constant at a set value relative to terminal 14 are applied to transistor 18 through its base electrode 32 by a transistor 34. A negative increase in the potential of base electrode 32 relative to the emitter 35 of transistor 18 causes an increased current flow between emitter 35 and the collector electrode 36, thus in effect lowering the series resistance of this transistor and acting to increase the potential difference between the output terminals 12 and 14, that is, to make terminal 12 more negative relative to terminal 14.

The signal which actuates transistor 34 to control main regulating transistor 18 is derived from a transistor 40. The emitter of transistor 34 and the emitter of transistor 40 are connected through respective ones of resistors 41 and 42 to a supply battery 44 whose negative terminal is connected to lead 16. The base electrode of transistor 40 is connected via a lead 45 to the collector electrode of a transistor 46. The latter comprises one side of a differential amplifier, the other side of which comprises a transistor 48. Minute variations in the voltage maintained across the output voltage terminals 12 and 14 are sensed by transistor 48 through its base electrode which is direct-current connected to lead 31 via the low resistance potentiometer 50. These variations are then amplified and applied to main regulating transistor 18 in proper phase to keep the output voltage constant. To this end the emitter electrodes of transistors 46 and 48 are connected to each other and to a resistor 52 which is connected to the negative side of a battery 54. The collector of transistor 46 is connected to a load resistor 56 whose upper end is connected to the positive side of a battery 58. The collector of transistor 48 is connected directly through a load resistor 60 to negative lead 16. The base of transistor 46 is biased with a voltage at the junction of two resistors 62 and 64 connected in series between lead 16 and the negative side of battery 54. Connected between the base of transistor 46 and the collector of transistor 48 is a positive feedback resistor 66 which substantially increases the gain of the differential amplifier comprised of these transistors. To insure stability, a filter is connected between leads 16 and 45, which filter comprises a resistor 67 and a capacitor 68.

The slider of potentiometer 50 is connected via a lead 69 to a constant current source, generally indicated at 70 and by adjusting the slider up or down, the voltage on lead 16 can be changed to a different value. This action and the operation of transistors 34, 40, 46, and 48 is explained in greater detail in the aforesaid copending application. In order that a minimum load be maintained at zero output voltage, a direct current return path from lead 31 to negative lead 16 is provided by a battery 72 in series with a large resistor 73.

The input voltage provided by source 27 is nominally constant; at no load it may for example be 40 volts while at full load it may drop to 30 volts due to the loss across its internal resistance 29. At no load and near zero output voltage, the voltage drop across main regulating transistor 18 is nearly equal to the no-load source voltage. As the output current is increased, the voltage drop across resistor 22 increases while the drop across transistor 18 is decreased to compensate for this. When the drop across transistor 18 decreases to a pre-determined value, for example, 5 volts, auxiliary transistor 26 begins to conduct thereby more and more shunting resistor 22. This pre-determined value of voltage and the size of resistor 22 are chosen so that the maximum power dissipation in transistor 18 does not under any conditions exceed its power rating. With the output voltage set at maximum, for example, 20 volts, at full load the voltage drop across transistor 18 will equal the predetermined value (e.g. 5 volts) and the drop across resistor 22 and transistor 26 in parallel will be the remaining difference between the input and output voltages (the drop across resistor 20 being neglected). To make the maximum power dissipation in transistor 26 equal the maximum power dissipation in transistor 18 (which means a more economical and efficient use of these elements) the pre-determined voltage across transistor 18 at which transistor 26 begins to turn on should be about 0.2 times the input voltage. As a result of providing resistor 22 and its shunting transistor 26, the sum of the power dissipation in transistor 18 and the dissipation in transistor 26 under any conditions is substantially less than the maximum power input to the circuit, i.e. the input voltage times full load current. This economizes on the size and power handling capacity of these transistors and makes possible an important saving in cost. Moreover, the transient response of this circuit is very fast and is far superior to that of a circuit wherein the input voltage is pre-regulated or controlled by a magnetic amplifier, for example. Additionally, even though the input voltage has a large ripple or hum content, nonetheless the output voltage of circuit 10 has almost no ripple at full load. In fact, the ripple in an actual circuit which has been built is only about one fifth as much as the minute amount of ripple obtained in one of the best previously known circuits.

The switching or shunting action of auxiliary transistor 26, described above, is controlled by a transistor 76 whose emitter is connected to the base 77 of the former. The emitter of transistor 76 is connected through a load resistor 78 to a battery 80, the negative side of which is connected to the junction 81 of resistors 20 and 22. The base of transistor 76 is connected via a lead 82 to the junction 83 of two resistors 84 and 85 connected across battery 86, the positive side of this battery being connected to lead 16. Thus lead 82 is held at a constant negative bias relative to lead 16. Lead 16 however, is positive relative to junction 81 because of the voltage drop across transistor 18 and resistor 20. When the drop across transistor 18 exceeds a pre-determined value, the net bias on the base of transistor 76 is positive and keeps it turned off. Now, as the voltage across main regulating transistor 18 begins to decrease and reaches the predetermined value, the net bias will become negative and transistor 76 will begin to conduct. This in turn will cause auxiliary transistor 26 to begin to conduct and thus to decrease the voltage drop across itself and resistor 22 in parallel. At full load and with the output voltage set at maximum, auxiliary transistor 26 will be conducting the maximum reached under any condition of operation of this circuit.

To prevent burnout or damage to main regulating transistor 18 or auxiliary transistor 26 by excessive internal power dissipation, caused for example by short-circuit of the output, when the current through current sensing resistor 20 exceeds a set value, auxiliary transistor 26 is immediately turned fully off. When this happens, the voltage feedback network including transistors 34, 40, 46, and 48 will drive main regulating transistor 18 fully on, i.e., to saturation, and lower the drop across it to try to make up for the increased voltage drop caused by the turning off of transistor 26. Under these conditions, the maximum current flow with the output terminals short-circuited is limited and will be determined primarily by the ohmic value of dropping resistor 22. Since the voltage drop across transistor 18 at saturation is very small, this maximum current can flow through it without injurious effects.

Auxiliary transistor 26 is turned off when the current exceeds the set value by a standby transistor 90, the emitter of which is connected to the positive or right-hand side of current sensing resistor 20. The base of transistor 90 is biased positive relative to the negative or left-hand end of resistor 20 by a voltage divider comprising a resistor 92 and an adjustable resistor 94 connected across battery 80. The setting of resistor 94 can be varied to set the bias in accordance with the desired maximum current through resistor 20 above which transistor 90 should turn on and turn auxiliary transistor 26 off. When the net bias on transistor 90, determined by the voltage drop across resistor 20 opposed to the drop across resistor 92, becomes sufficiently negative, the transistor will turn on. When this happens, current can flow from its emitter to its collector through a de-coupling diode 96 to lead 82, thus raising its potential to turn transistor 76 off and thereby turn auxiliary transistor 26 off. When the load current again falls below the set value, transistor 90 is turned off, thus freeing transistor 26 to turn on.

In a circuit substantially identical to circuit 10 which has been built and successfully operated, the input voltage was 40 volts at no load, and 30 volts at 2 amperes full load. The output voltage could be regulated at any value from 0 to 20 volts and the ripple was only about 100 microvolts R.M.S. at full load. Transistor 18 comprised two type 2N553 units in parallel, and transistor 26 comprised two type 2N456 units in parallel. Resistor 20 was 1 ohm and resistor 22, 11 ohms. Transistor 26 was turned on when the drop across transistor 18 fell to about 5 volts. Transistor 90 was turned on when the load current exceeded about 2.2 amperes.

The above description illustrates a specific embodiment of the invention. Various changes in this embodiment may occur to those skilled in the art and these can be made without departing from the spirit or scope of the invention as set forth.

I claim:

1. An improved voltage regulating circuit comprising: an output lead, an input direct-voltage source, a main regulating transistor and a voltage dropping resistor connected in series relation between said lead and said source, a feedback network connected between said output lead and said main transistor and acting to keep said output voltage constant at a set value, an auxiliary transistor connected to variably bypass current around said voltage dropping resistor, and means responsive to the voltage drop across said main transistor to control the current flow through said auxiliary transistor.

2. The circuit as in claim 1 in further combination with current sensing means to turn said auxiliary transistor off when the current drawn from said circuit exceeds a set value.

3. An improved all-transistor voltage regulating circuit comprising an input adapted to be energized with a nominally constant direct voltage, an output, a main power transistor and a voltage dropping resistor connected in series between said input and output, a plurality of transistors connected in a feedback network between said output and said main transistor to keep the voltage on said output constant, an auxiliary power transistor connected in parallel with said voltage dropping resistor, and means connected to said auxiliary power transistor to sense the voltage drop across said main transistor to cause said auxiliary power transistor to conduct when the voltage drop across said main transistor decreases to a predetermined value.

4. The circuit in claim 3 in further combination with current overload means to turn said auxiliary transistor off when the current drawn from said circuit exceeds a set value.

5. The circuit in claim 4 wherein said overload means includes a small resistor in series with said main transistor, and a standby transistor biased with the voltage drop across said small resistor and connected to turn said auxiliary transistor off when the voltage across said small resistor exceeds a given value.

6. In a voltage regulating circuit having an input supplied by a direct voltage, an output, and a voltage feedback network to regulate the voltage on said output: a series voltage dropping arrangement comprising in series from said input to said output a voltage dropping resistor, a main power transistor, an auxiliary power transistor connected in parallel with said voltage dropping resistor, fixed bias means connected to said output, and a drive transistor biased by said bias means and the voltage drop across said main transistor and connected to turn said auxiliary transistor on when the drop across said main transistor decreases to a predetermined value, said main transistor being controlled by said feedback network in proper phase to maintain the output voltage constant.

7. The arrangement as in claim 6 wherein a small current sensing resistor is inserted between said voltage dropping resistor and said main regulating transistor, and a standby transistor connected to turn said auxiliary transistor off when the voltage drop across said current sensing resistor exceeds a given level.

8. The arrangement as in claim 6 wherein said predetermined value of voltage across said main transistor is about 0.2 times the input voltage.

9. The arrangement in claim 6 wherein said voltage dropping resistor has a value equal the input voltage minus the predetermined value of voltage across said main transistor, both divided by the full load current.

References Cited in the file of this patent

UNITED STATES PATENTS

| 2,776,382 | Jensen | Jan. 1, 1957 |
| 2,832,900 | Ford | Apr. 29, 1958 |
| 2,888,632 | Livezey | May 26, 1959 |